J. A. FERRON.
SPROCKET ATTACHMENT.
APPLICATION FILED NOV. 25, 1912.
1,204,555.
Patented Nov. 14, 1916.
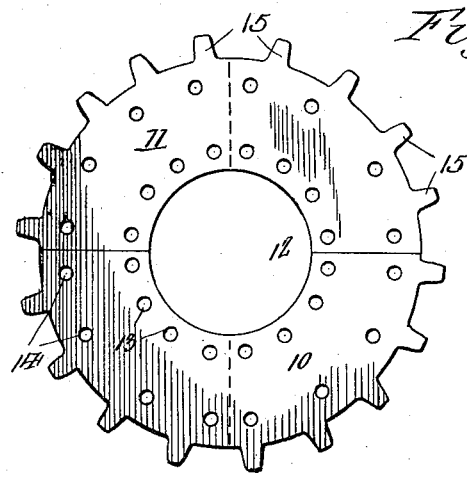
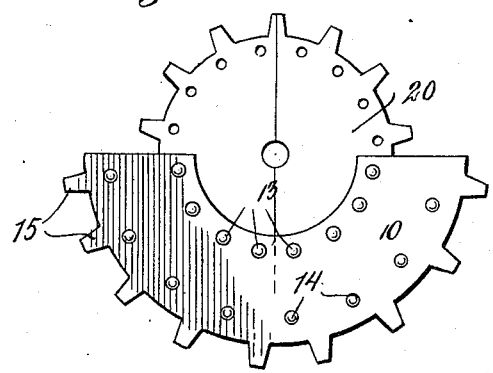
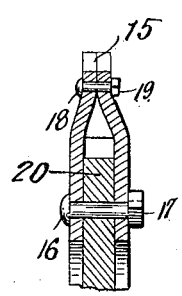
WITNESSES
INVENTOR
John A. Ferron,
his Attorney

UNITED STATES PATENT OFFICE.

JOHN A. FERRON, OF COATESVILLE, PENNSYLVANIA.

SPROCKET ATTACHMENT.

1,204,555.

Specification of Letters Patent.

Patented Nov. 14, 1916.

Application filed November 25, 1912. Serial No. 733,353.

*To all whom it may concern:*

Be it known that I, JOHN A. FERRON, a citizen of the United States, residing at Coatesville, in the county of Chester and State of Pennsylvania, have invented a new and useful Improvement in Sprocket Attachments, of which the following is a specification.

My invention relates to a sprocket attachment and more specifically to a device which may be attached to an ordinary sprocket wheel, either the driving or driven wheel so as to increase the diameter of the same and consequently change the speed of the bicycle or vehicle upon which it is used.

An object of my invention is to provide a device of the foregoing nature which may be easily attached to and detached from the sprocket wheel when occasion requires.

Another object of my invention is to provide a sprocket attachment, composed of a pair of disks disposed on each side of the sprocket wheel, the outer edges of the disks being bent into engagement with each other, whereby the teeth upon the same may be engaged in the links of the sprocket chain.

A further object of my invention is to provide a device of the above character which is applicable to either the driving or driven sprocket wheel so as to increase or decrease the speed of the machine as is desired.

A still further object of my invention is to provide a device of this nature which is constructed of but a few simple parts whereby it may be manufactured and placed upon the market at a minimum cost.

It is readily appreciated, that bicycles and other vehicles employing a sprocket chain are normally driven at a minimum speed. This speed is attained usually by making the driving sprocket wheel considerably larger than the driven sprocket wheel. It will further be appreciated that by one turn of the driving sprocket, the driven sprocket will be revolved a number of times. Consequently the operator encounters considerable difficulty when riding a bicycle in climbing a hill. On automobiles and devices of similar nature, mechanism, usually very complicated, is provided for changing the gearing of the vehicle into either high, or low gear. It will hardly warrant the manufacturer to make a bicycle or motorcycle upon this principle, because of the great expense.

When a bicycle is operated upon smooth roads, as in a city, the operator finds little difficulty in propelling the same very speedily. Now if this operator desires to travel in the country, or to carry heavy loads upon his machine, great difficulties are encountered, which will be hereinafter set forth. The first difficulty is that the driving sprocket, being larger than the driven sprocket requires a great amount of energy to rotate the same. This continued amount will soon tire the operator, and he will consequently stall on a hill.

It is my object to provide a simple and inexpensive device which may be carried in a very small package, yet one which can be readily attached to the driving sprocket so as to increase the diameter of the same and consequently lessen the energy required to propel the device.

It is thought that the advantage of my device will be readily appreciated and it is also thought that it will be recognized that the same can be manufactured and placed upon the market at a very low cost.

It will be recognized that my device can be used upon an automobile or upon a motorcycle if occasion should require as I do not limit myself to any specific application.

With the above and other objects in view, my invention relates to such details of construction and in the arrangement and combination of the several parts as will be hereinafter fully described and specifically pointed out in the appended claims.

In describing my invention in detail, reference will be had to the accompanying drawings wherein like characters denote like or corresponding parts throughout the several views, and in which:—

Figure 1 is a side elevation of one of the disks used in my device. Fig. 2 is a side elevational view of a sprocket wheel showing a section of one of the disks secured thereto, the remaining sections being removed. Fig. 3 is an edge view of the section of one of the disks and Fig. 4 is a sectional view showing the application of my invention to a sprocket wheel.

In the accompanying drawings wherein is illustrated the preferred form of my invention, the numerals 10 and 11 designate the semi-circular sections of one of the disks employed in connection with my invention. Each of the sections at a central portion thereof is provided with a semi-circular cut out portion, which, when the sections are disposed together, registers with the adjacent cut out portions forming an opening 12.

A plurality of apertures 13 are provided in the disk sections, it being assumed that when the sections are placed together these apertures will be near the center of the resulting disk, while other openings 14 are provided near the outer circumference of the disk. For the purpose, teeth 15 are formed upon each of the sections, the teeth being of preferably the standard size, although, however, they can be varied according to the diameters of the disks.

In Fig. 4 I have illustrated my invention in practical use. Bolts 16 extend through each of the disks and a sprocket wheel 20, and are secured in place by the nuts 17. The bolts extend through the apertures 13, as is clearly shown. Other bolts 18 extend through the openings 14 and have nuts 19 operative thereon, whereby when the nuts 19 are screwed tightly upon the bolts, the disks will be bent into the position shown in Fig. 4 and allow the teeth 15 of one disk to be bent adjacent the teeth on the other disk.

From the foregoing, it is thought that the advantages and novel features of my invention will be readily comprehended.

I desire it to be understood that I may make slight changes in the construction and in the arrangement and combination of the several parts, provided, however, such changes fall within the scope of the subjoined claims.

Having thus fully described my invention, what I claim as new and desire to secure by Letters Patent, is:—

1. An attachment for sprocket wheels including a sprocket wheel of uniform thickness having flat sides, a pair of disks of uniform thickness having teeth formed on their outer peripheries, means for removably securing the disks to the flat sides of the sprocket wheel adjacent the outer edges thereof, and means for removably securing the disks together adjacent their outer edges so that the teeth of one disk register with the teeth of the other disk to consequently provide a large sprocket wheel in a continuation of the plane of said first mentioned sprocket wheel.

2. In an attachment for sprocket wheels, a sprocket wheel, a pair of disks each including two semicircular sections having teeth formed on their outer peripheries, means for removably securing the sections to the sides of said wheel so that the meeting edges of one set of sections are arranged in a plane substantially at right angles to the plane of the meeting edges of the other set of sections, the disks extending slightly beyond the periphery of said wheel, and common means for drawing the sections of said disks together so that the meeting line of the two disks will be directly over the center of said sprocket wheel and for removably securing the disks so that the teeth of one disk register with the teeth of the other disk to consequently provide a large sprocket wheel.

JOHN A. FERRON.

Witnesses:
PAUL S. STANSBURY,
CARL O. BENNER.

Copies of this patent may be obtained for five cents each, by addressing the "Commissioner of Patents, Washington, D. C."